United States Patent Office 3,252,816
Patented May 24, 1966

3,252,816
PIGMENTED EXTRUDABLE VISCOSE SOLUTIONS
Frederic L. Sievenpiper, Alden, N.Y., assignor to Allied Chemical Corporation, New York, N.Y., a corporation of New York
No Drawing. Filed May 28, 1962, Ser. No. 197,913
7 Claims. (Cl. 106—165)

This invention relates to the coloration of viscose solutions adapted for extrusion into colored shaped bodies such as filaments, yarn, films and the like. More particularly, it relates to viscose solutions colored with vat dyestuffs and especially this invention relates to vat pigmented viscose solutions suitable for extrusion without gelling.

Viscose rayon, or regenerated cellulose, is usually produced by treating wood pulp with aqueous caustic soda. The alkali cellulose solution so formed is aged and thereafter converted into sodium cellulose xanthate by treatment with carbon disulfide. This product, after proper aging, filtration and other conditioning treatments is extruded through fine orifices of an extrusion device, such as a spinneret, into a coagulating bath which normally comprises an inorganic acid and salts such as sodium sulfate and zinc sulfate. The threads or film so formed are treated with purifying solutions to remove sulfur and other agents present in the viscose solution and/or coagulating bath, washed, sized, dried and wound into suitable packages.

It is well known to produce colored viscose structures by adding pigments in finely dispersed form to the viscose solution. Vat dyestuffs, because of their desirable fastness qualities, availability in ultra fine particulate form, and high tinctorial strength are used in this connection. In the preparation of vat pigmented viscose solution, as it is generally practiced, an aqueous suspension of the dispersed vat dyestuff is admixed with a ripened viscose solution and after blending the mixture of pigment and viscose, the mass is filtered and extruded through the orifices of a suitable extruder. It has been found that the pigmented viscose solutions prepared in this manner tend to thicken or gel. This thickening of the viscose solution is particularly undesirable since it is more difficult to extrude. Especially so, since the orifices are in contact with the coagulating bath which is at a higher temperature than the viscose solution and the resultant heat transfer accelerates the thickening reaction, causing eventually a deposit of nonfluid material at the orifice and a blockage or effective reduction in the size of the orifice. This causes a similar reduction in the diameter of the fiber or thickness of the film which is evidenced by weak spots or striations in the regenerated cellulose materials. Consequently, this procedure leaves something to be desired.

It is, therefore, a principal object of this invention to devise an improved process for preparing vat pigmented viscose solutions adapted for extrusion into uniformly shaped bodies of more consistent physical characteristics.

It is a further object of this invention to provide a process for preparing a vat pigmented viscose solution wherein prior art difficulties of thickening and gelling of the solution are substantially eliminated.

Other objects will be apparent from the following description of my invention.

It has now been discovered that the presence of small amounts of certain water soluble organic nitro compounds in the viscose solutions containing also pigments of the vat dyestuff class dispersed therein, is effective in inhibiting the undesirable thickening or gelling of the colored viscose spinning solution. The colored viscose solution can be extruded over an extended period without interruptions of the operation due to clogging of the spinneret orifices by the depositing therein of gelled viscose. The resultant extruded cellulosic material, also, is of more consistent physical form. It is free from the defects, such as weak spots or striations, in the film or fiber, which characterize the colored product from viscose solutions not containing the organic nitro compound.

My invention contemplates the use of any organic nitro compound which is soluble in water to the extent of at least about 1 part by weight of nitro compound per 1000 parts water at 20° C. It is obvious that the individual members of this class will vary widely in their effectiveness and speed of operation. Practical considerations of cost, ease of preparation solubility in acid and alkaline solutions, will serve to limit the size of the class of suitable compounds. For these reasons, it is preferred to use water soluble nitro compounds of the benzene, and lower aliphatic series. Especially preferred are the nitrobenzene sulfonic acids, or which meta nitrobenzene sulfonic acid is selected for the purpose of illustration, primarily because of their availability. Other organic nitro compounds which can be used include:

p-Nitrotoluene-o-sulfonic acid
4,4'-dinitrostilbene-2,2-disulfonic acid
1-nitronapthalene-4-sulfonic acid
2-nitrobutanol-1
2-nitropropane
2-methyl-2-nitro-1-propanol
Nitroethane Mixtures of these water soluble nitro compounds are contemplated for use in this invention also.

The amount of organic nitro compound used is not critical and can be varied over a considerable range. However, inasmuch as it is believed that there is an interreaction between the cellulose xanthate and the vat pigment which results in a thickening of the viscose solution, the amount of nitro compound used should take into consideration the time of contact between the viscose solution and the vat pigment, and the temperature and caustic alkali concentration of the spinning solution.

In general, the amount (based on the weight of cellulose present in the viscose solution) of organic nitro compound used can vary from as little as 0.1% by weight for the more effective compounds to as much as 10% or more of the less effective compounds. Preferably, an amount within the range of about 0.2% to about 1.0% is used. This amount will generally be effective in all instances. Preferably the nitro compound is admixed with the pigment prior to addition to the viscose solution.

The vat dyestuffs used as pigments comprise a large and well known class of valuable colorants. Inasmuch as vat dyestuffs vary widely among themselves with respect to the degree to which they promote gelling, it will be obvious that for the purposes of their use as colorants for viscose solutions, the preferred vat dyestuffs are those which have the lesser gelling effect. Such a dyestuff is exemplified by Carbanthrene Flavine GC (C.I. 67300). Carbanthrene Golden Orange RRT (C.I. 59075) exemplifies the vat pigments which are useful though not preferred, under the conditions of the present invention. In addition to the anthraquinone dyes already mentioned, viscose solutions can be pigmented in accordance with this invention by a great number of dyes typical of which are the following anthraquinone and indigoid dyes:

|  | New C.I. No. |
|---|---|
| Carb. Blue BEF Double Paste | 69825 |
| Carb. Brilliant Green Double Paste | 59825 |
| Indigo SCP Paste | 73000 |
| Carb. Scarlet R Paste | 71140 |
| Carb. Violet 4R Paste | 60010 |
| Carb. Red FBB Double Paste | 67000 |
| Vat Red Violet RH Paste | 73385 |

Mixtures of such suitable dyestuffs can also be used.

It is known to use vat dyestuffs to pigment viscose solutions. It is known also to prepare such colorants in finely divided form and to utilize them in dispersed form by means of various surfactants and other adjuvants. The present invention is not concerned with the preparation and/or formulation of such vat dyestuffs in a form suitable for use in the viscose solution nor in the preparation of the latter, since such preparations are well known in the art and are considered to be well within the skill of those versed in these arts.

The following examples will illustrate the present invention. Parts and percentages are by weight and temperatures are in degrees centigrade.

*Example 1*

An aged viscose spinning solution containing 7.4 percent of cellulose, 7.0 percent of caustic soda and 1.1 percent of combined sulfur was prepared in the usual manner. To this solution was added a mixture of Carbanthrene Flavine GC Single Paste dispersed to less than 1 micron with suitable surfactants and containing an amount of colorant equivalent to 1.0% of the cellulose in the spinning solution and 0.5 percent of sodium m-nitrobenzene sulfonate, containing sufficient water to make a fluid paste. The resultant mass was mixed thoroughly to insure the complete dispersion of the pigment throughout the spinning solution.

Within a period of about 1 hour extrusion of the pigmented solution was started through a spinning jet into an aqueous coagulating bath consisting of 9.5 percent sulfuric acid, 20 percent sodium sulfate and 4.5 percent zinc sulfate at 45° to 50°. The pigmented threads were drawn, washed in hot (95°) aqueous sulfuric acid, washed free of acid, bleached, finished and dried in the usual manner. The spinning procedure using the single batch of viscose-pigment mixture was carried out without interruption for a period of about 7 days before it became necessary to remove and clean the spinnerets.

The pigmented regenerated cellulose filaments thus prepared were of consistent cross section, substantially free from weak spots and breaks.

In contrast, pigmented rayon filaments prepared in the identical manner but in which no sodium m-nitrobenzene sulfonate had been added to the spinning solution were found to vary considerably in cross section and due to the plugging of the orifices with gelled material after about 6 hours, the spinning operation had to be interrupted to clean or replace the plugged spinnerets.

By using instead of sodium m-nitrobenzene sulfonate, 1.0 percent of 2 nitropropane, there are obtained pigmented viscose rayon filaments of identical characteristics and the spinning operation was continued without interruption for a period of at least three days.

*Example 2*

A mixture of 5 parts of Carbanthrene Golden Orange RRT Paste (an aqueous mixture of finely divided vat dyestuff and dispersing agents) and 0.7 part of sodium m-nitrobenzene sulfonate in 5 parts of water was introduced into 1000 parts of an aged viscose solution containing 100 parts of α-cellulose. The mixture was thoroughly blended and immediately thereafter the pigment viscose solution was extruded over a period of 72 hours between knife edges set 3 mils apart in the usual manner into a bath containing 12 percent sulfuric acid, 27 percent sodium sulfate and 1.0 percent zinc sulfate.

The pigmented film so obtained was stretched, aftertreated and dried in the usual manner.

The resultant film was substantially free from deviations in thickness.

A similar pigmented film prepared from a viscose solution to which no nitro compound had been added developed numerous striations, especially during latter portion of the run, due to variations in the thickness of the film caused by deposits of gelled viscose on the knife edges. After about 6 hours, the thickness of the film became so irregular as to be commercially unacceptable and the extrusion was interrupted to permit removal of gelled viscose from the knife edges.

A regenerated cellulose film of characteristics similar to that of Example 2 was produced by substituting 0.5 part of 2-nitrobutanol-1 for the m-nitrobenzene sodium sulfonate in the above example.

It can thus be seen that an effective improvement in operation for the production of pigmented regenerated cellulose has been devised. The foregoing examples, it will be understood, are purely illustrative and many variations in the specific details set out therein can be employed without departing from the spirit of the invention.

Thus, although it is convenient to add the nitro compound to the aged viscose solution in admixture with the vat pigment, the addition can be made before or after the pigment.

I claim:

1. An extrudable viscose solution pigmented with a vat pigment and containing a sufficient amount of a water soluble organic nitro compound to substantially prevent thickening or gelling of the viscose solution.

2. The extrudable viscose solution of claim 1, which contains about 0.1% to about 10%, by weight of cellulose present, of an organic nitro compound soluble in water to the extent of at least one part by weight per 1000 parts water at 20° C.

3. The extrudable viscose solution of claim 2, which contains 0.1% to about 1.0% of m-nitrobenzene sulfonic acid.

4. In the extrusion of viscose solutions containing a vat pigment which induces gelling, the improvement which comprises providing in the solution of viscose and pigment during extrusion a sufficient amount of a water soluble organic nitro compound to substantially prevent thickening and gelling of the viscose solution during extrusion.

5. In the extrusion of viscose solutions containing a vat pigment which induces gelling, the improvement which comprises adding to the viscose solution a mixture of a vat pigment and a sufficient amount of a water soluble organic nitro compound to prevent thickening and gelling of the solution during extrusion, and extruding the mixture.

6. The process of claim 4 in which the nitro compound is provided in an amount from about 0.1% to about 10% by weight of cellulose present.

7. The process of claim 6 in which the organic nitro compound is meta-nitrobenzene sulfonic acid.

References Cited by the Examiner

UNITED STATES PATENTS

| | | | |
|---|---|---|---|
| 2,125,031 | 7/1938 | Polak et al. | 18—54 |
| 2,145,580 | 1/1939 | Bley | 106—165 |
| 2,432,085 | 12/1947 | Bley | 106—165 |
| 2,451,148 | 10/1948 | Blaas | 18—54 |
| 2,852,333 | 9/1958 | Cox et al. | 106—165 |
| 2,993,018 | 7/1961 | Steinlin | 106—165 |
| 3,026,171 | 3/1962 | Schonfeldt et al. | 18—54 |
| 3,110,551 | 11/1963 | Fletcher et al. | 106—165 |

ALEXANDER H. BRODMERKEL, *Primary Examiner.*

MORRIS LIEBMAN, *Examiner.*

A. LIEBERMAN, L. HAYES, *Assistant Examiners.*